United States Patent
Yasui et al.

(10) Patent No.: US 8,711,469 B2
(45) Date of Patent: Apr. 29, 2014

(54) ELECTROPHORETIC ELEMENT AND DISPLAY DEVICE

(71) Applicant: Sony Corporation, Tokyo (JP)

(72) Inventors: Atsuhito Yasui, Kanagawa (JP); Hidehiko Takanashi, Kanagawa (JP); Ken Kobayashi, Kanagawa (JP); Ryo Kasegawa, Kanagawa (JP); Aya Shuto, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/900,069

(22) Filed: May 22, 2013

(65) Prior Publication Data

US 2013/0258450 A1 Oct. 3, 2013

Related U.S. Application Data

(62) Division of application No. 13/359,153, filed on Jan. 26, 2012, now Pat. No. 8,482,844.

(51) Int. Cl.
*G02B 26/00* (2006.01)
*G02F 1/133* (2006.01)
*G02F 1/1335* (2006.01)
*G03G 17/04* (2006.01)

(52) U.S. Cl.
USPC ............... 359/296; 349/33; 345/105; 430/32

(58) Field of Classification Search
USPC ......... 359/296, 245, 253–254, 290–291, 298; 349/33; 345/49, 105, 107; 430/31–32
See application file for complete search history.

(56) References Cited

U.S. PATENT DOCUMENTS

| | | | |
|---|---|---|---|
| 3,892,568 A | 7/1975 | Ota | |
| 8,400,705 B2 * | 3/2013 | Murakami | ............... 359/296 |
| 2001/0041339 A1 | 11/2001 | Anderson et al. | |
| 2007/0196401 A1 | 8/2007 | Naruse et al. | |
| 2008/0112040 A1 | 5/2008 | Suwabe et al. | |
| 2008/0198443 A1 | 8/2008 | Yoshimura et al. | |

FOREIGN PATENT DOCUMENTS

| | | |
|---|---|---|
| JP | 50-15115 | 6/1975 |
| JP | 50-15120 | 6/1975 |
| JP | 2551783 | 8/1996 |
| JP | 2002-244163 | 8/2002 |
| JP | 2003-526817 | 9/2003 |
| JP | 2005-107146 | 4/2005 |
| JP | 2005-128143 | 5/2005 |
| JP | 4188091 | 9/2008 |

* cited by examiner

*Primary Examiner* — Dawayne A Pinkney
(74) *Attorney, Agent, or Firm* — Rader, Fishman & Grauer PLLC

(57) ABSTRACT

An electrophoretic element includes: an electrophoretic particle; a porous layer formed of a fibrous structure containing a non-migrating particle having optical reflective characteristics different from those of the electrophoretic particle and having a plurality of pores; and a partition that is partially adjacent to the porous layer and defines a space for accommodating the electrophoretic particle. An area rate of the pores per unit area of the porous layer is small in an adjacent region where the partition is adjacent to the porous layer compared with in a non-adjacent region where the partition is not adjacent to the porous layer.

12 Claims, 4 Drawing Sheets

ELECTROPHORETIC ELEMENT AND DISPLAY DEVICE

CROSS REFERENCES TO RELATED APPLICATIONS

This application is a Divisional of application Ser. No. 13/359,153, filed Jan. 26, 2012, which claims priority from Japanese Application Number 2011-031861, filed Feb. 17, 2011, the entire contents of which are incorporated herein by reference.

BACKGROUND

The present technology relates to an electrophoretic element including an electrophoretic particle and a porous layer, and a display device including the electrophoretic element.

In recent years, a demand for a display device with low power consumption and high-grade image quality has been increased as a result of widespread use of mobile devices typified by a mobile phone or a personal digital assistant (PDA). In particular, an electronic book terminal for reading application in order to read character information for a long time is recently noticed as a result of launch of the distribution service of the electronic books, leading to a demand for a display having a display grade suitable for such an application.

A cholesteric liquid crystal display, an electrophoretic display, an electrochromic display, or a twist-ball display have been proposed as the reading display. In particular, a so-called reflective-type display is preferable. This is because the reflective-type display performs light display on the basis of reflection (scattering) of outside light as in paper, leading to a display grade similar to paper. Moreover, the display need not include a backlight, leading to reduction in power consumption.

A prominent candidate of the reflective-type display includes the electrophoretic display that creates light and darkness (contrast) on the basis of an electrophoretic phenomenon. This is because the electrophoretic display is low in power consumption and fast in response. Thus, various investigations have been made on a displaying method of the electrophoretic display.

Specifically, a method has been proposed, in which two types of charged particles, which are different in optical reflective characteristics and in a polarity, are dispersed in an insulating liquid, and the respective charged particles are moved depending on an electric field on the basis of such a difference in the polarity (for example, see Japanese Examined Patent Application Publication No. 50-015115 and Japanese Patent No. 4188091). In this method, distribution states of the two types of the charged particles are differently changed depending on the electric field, creating a contrast due to such a difference in the optical reflective characteristics.

In addition, another method has been proposed, in which charged particles are dispersed in an insulating liquid, and a porous layer, which has a different optical reflective characteristics from those of the charged particles, is provided to move the charged particles through pores in the porous layer depending on an electric field (for example, see Japanese Unexamined Patent Application Publication No. 2005-107146, Japanese Examined Patent Application Publication No. 50-015120, Japanese Unexamined Patent Application Publication No. 2005-128143, and Japanese Unexamined Patent Application Publication No. 2002-244163). For the porous layer, a polymer film having pores formed by laser drilling, a synthetic fiber woven fabric, a open-cell porous polymer, or the like is used. In this method, a distribution state of the charged particles is changed depending on the electric field, leading to a contrast due to such a difference in the optical reflective characteristics between the charged particles and the porous layer.

Still another method has been proposed, in which charged particles are enclosed in microcapsules, or a partition structure is provided to define areas in which the charged particles may exist (for example, see Japanese Patent No. 2551783 and Japanese Unexamined Patent Application Publication (Translation of PCT Application) No. 2003-526817). This method suppresses agglomeration, precipitation, convection, and the like of the charged particles.

SUMMARY

While various displaying methods of the electrophoretic display have been proposed, a display grade is still not satisfactorily high in each method, and the contrast and response speed need to be further improved in consideration of future development of color display or video display. Moreover, power consumption needs to be importantly kept low to make the most of the unique advantage of the electrophoretic display.

It is desirable to provide an electrophoretic element that achieves a high contrast and fast response with low power consumption, and provide a display device including the electrophoretic element.

An electrophoretic element according to an embodiment of the technology includes an electrophoretic particle; a porous layer formed of a fibrous structure containing a non-migrating particle having optical reflective-characteristics different from those of the electrophoretic particle and having a plurality of pores; and a partition that is partially adjacent to the porous layer and defines a space for accommodating the electrophoretic particle. An area rate of the pores per unit area of the porous layer is small in an adjacent region where the partition is adjacent to the porous layer compared with in a non-adjacent region where the partition is not adjacent to the porous layer.

A display device according to an embodiment of the technology includes the above-described electrophoretic element between a pair of substrates, one or both of which is optically transparent.

It is noted that "optical reflective characteristics" refer to so-called reflectance of light (outside light). The optical reflective characteristics of the non-migrating particles are different from those of the electrophoretic particles. This is because a contrast is created due to such a difference in light reflectance. Moreover, "area" of each of the porous layer and the pores refers to area along a section in any direction of the porous layer. To measure the area, various types of microscopes may be used to observe the section. Furthermore, "display surface" refers to a surface on an image display side of the display device. In the electrophoretic element, a surface on a side where the partitions are not adjacent to the porous layer corresponds to the display surface.

According to the electrophoretic element according to the embodiment of the technology, the porous layer is formed of the fibrous structure that contains the non-migrating particles having the optical reflective characteristics different from those of the electrophoretic particles. In such a case, while the porous layer has enough number of the pores having enough size to allow movement of the electrophoretic particles, the outside light is greatly irregularly reflected even on the porous layer having a small thickness. This improves light reflectance of the porous layer, leading to an increase in a contrast. In addition, this facilitates the movement of the electrophoretic particles through the pores, resulting in a reduction in time and energy for the movement.

In addition, the partitions are partially adjacent to the porous layer, and an area rate of the pores per unit area of the porous layer is small in the adjacent regions compared with in the non-adjacent regions. In such a case, if the partitions are adjacent to the porous layer on a side opposite to the display surface of the display device, the partitions define areas in which the electrophoretic particles may exist, and thus the electrophoretic particles hardly moves through the porous layer in the adjacent regions, so that diffusion, convection, agglomeration, and the like of the electrophoretic particles are suppressed. In addition, the partitions are shielded by the porous layer as viewed from a display surface side. These suppress a reduction in image quality, such as unevenness in display, leading to stable image display. Moreover, a reduction in a contrast due to existence of the partitions is suppressed, leading to an improvement in the contrast.

Consequently, a high contrast and fast response are achieved with low power consumption. In addition, according to the display device including the electrophoretic element of the embodiment of the technology, high-grade images may be displayed with low power consumption.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Hereinafter, an embodiment of the technology will be described in detail with reference to drawings. The description is made in the following order.
1. Configuration of display device including electrophoretic element
2. Method of manufacturing display device
[1. Configuration of Display Device Including Electrophoretic Element]

Figure 1:
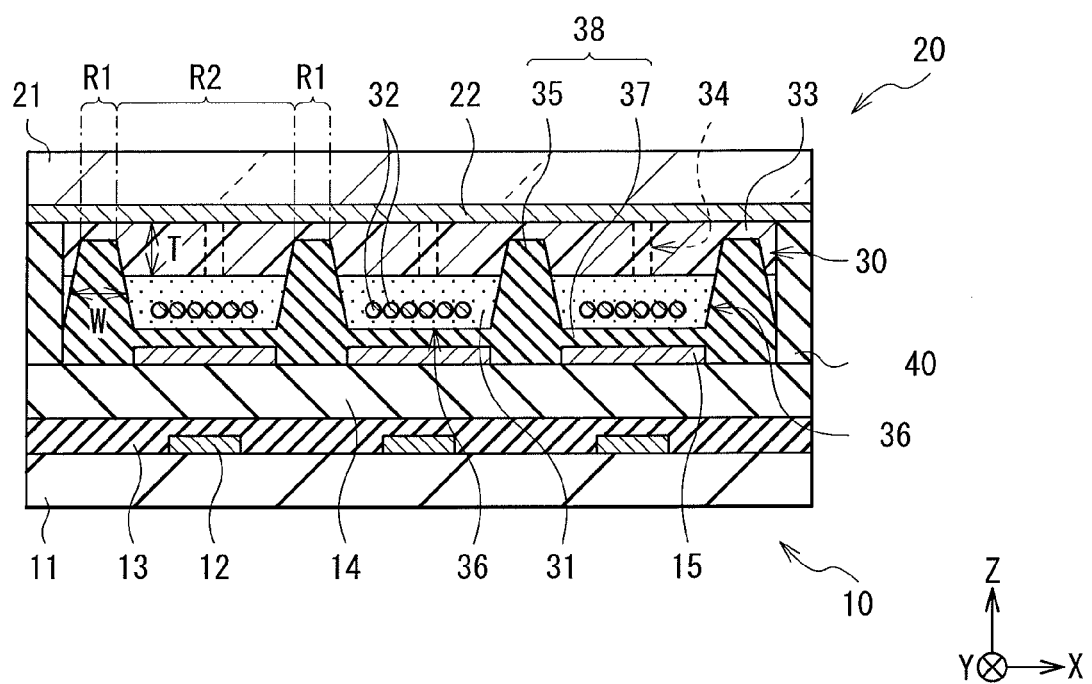
FIG. 1 is a sectional view illustrating a configuration of a display device including an electrophoretic element according to an embodiment of the technology.

First, a configuration of a display device including an electrophoretic element according to an embodiment of the technology is described. FIG. 1 illustrates a sectional configuration of the display device, and FIGS. 2 and 3 each illustrate a planar configuration of a major part of the display device shown in FIG. 1. FIG. 1 illustrates a section along the I-I line shown in FIG. 3.

The electrophoretic element according to the embodiment of the technology may be applied to various uses such as a display device without particular limitation. While a case where the electrophoretic element is applied to the display device is exemplified herein, the configuration of the display device is illustrated merely by way of example and may be optionally modified or altered.
[General Configuration of Display Device]

The display device is an electrophoretic display that displays an image (for example, character information) on the basis of the electrophoretic phenomenon, or a so-called electronic paper display. The display device includes, as illustrated in FIG. 1, a drive substrate 10 and a counter substrate 20, which are oppositely disposed across an electrophoretic element 30 and a spacer 40, and has a display surface on a counter substrate 20 side, for example. The meaning of "having a display surface on the counter substrate 20 side" is that images are displayed on the counter substrate 20 side.
[Drive Substrate]

The drive substrate 10 includes, for example, a plurality of thin film transistors (TFTs) 12, a protective layer 13, a planarization insulating layer 14, and a plurality of pixel electrodes 15 provided in this order on a surface of a support base 11. The TFTs 12 and the pixel electrodes 15 are arranged in a matrix or segment pattern in correspondence to pixel arrangement, for example.

The support base 11 is formed of, for example, an inorganic material, a metal material, or a plastic material. The inorganic material includes, for example, silicon (Si), silicon oxide ($SiO_x$), silicon nitride ($SiN_x$), and aluminum oxide ($AlO_x$). The silicon oxide includes, for example, glass or spin-on-glass (SOG). The metal material includes, for example, aluminum (Al), nickel (Ni), and stainless steel. The plastic material includes, for example, polycarbonate (PC), polyethylene terephthalate (PET), polyethylene naphthalate (PEN), and polyethyl ether ketone (PEEK).

The support base 11 may be optically transparent or non-transparent. This is because since images are displayed on the counter substrate 20 side, the support base 11 need not be necessarily transparent. In addition, the support base 11 may include a rigid substrate such as a wafer, or may include flexible thin glass or a flexible film. In particular, the latter is preferable because a flexible (foldable) display device may be achieved.

The TFT 12 is a switching element for selecting a pixel. The TFT 12 may be an inorganic TFT including an inorganic semiconductor layer as a channel layer, or an organic TFT including an organic semiconductor layer as the channel layer. The protective layer 13 and the planarization insulating layer 14 are formed of an insulating material such as polyimide. If a surface of the protective layer 13 is flat enough, the planarization insulating layer 14 may be omitted. The pixel electrode 15 is formed of a conductive material such as gold (Au), silver (Ag), copper (Cu), aluminum (Al), aluminum alloy, and indium oxide/tin oxide (ITO). The pixel electrode 15 is connected to the TFT 12 through a contact hole (not shown) provided through the protective layer 13 and the planarization insulating layer 14.

FIG. 1 illustrates a case where the TFTs 12 are separately arranged for each cell 36 described below (one TFT 12 is disposed for one cell 36). However, this is not limitative, and the numbers of the cells 36 and of the TFTs 12 and formation areas of a cell 36 and of a TFT 12 may be optionally set. For example, two TFTs 12 may be disposed for three cells 36, or a boundary between the adjacent two TFTs 12 may be located within the formation area of the cell 36.

[Counter Substrate]

The counter substrate 20 includes, for example, a counter electrode 22 provided over the entire surface of the support base 21. However, the counter electrode 22 may be arranged in a matrix or segment pattern as in the pixel electrodes 15.

The support base 21 is formed of a similar material to that of the support base 11 except that it is optically transparent. The support base 21 needs to be optically transparent because images are displayed on the counter substrate 20 side. The counter electrode 22 is formed of, for example, a translucent conductive material (transparent electrode material) such as indium oxide/tin oxide (ITO), antimony oxide/tin oxide (ATO), fluorine-doped tin oxide (FTO), and aluminum-doped zinc oxide (AZO).

For displaying images on the counter substrate 20 side, the display device (electrophoretic element 30) is viewed through the counter electrode 22. As a result, optical transparency (light transmittance) of the counter electrode 22 is preferably high to the utmost, for example, 80% or more. In addition, electric resistance of the counter electrode 22 is preferably low to the utmost, for example, 100Ω/□ or less.

[Electrophoretic Element]

The electrophoretic element 30 includes migrating particles 32 dispersed in an insulating liquid 31, a porous layer 33 having a plurality of pores 34, and partitions 35 that are partially adjacent to the porous layer 33. FIG. 1 shows only part of the pores 34 to simplify the illustrated content.

[Insulating Liquid]

The insulating liquid 31 fills a space enclosed by the drive substrate 10, the counter substrate 20, and the spacer 40, for example.

The insulating liquid 31 includes, for example, one or more of non-aqueous solvents such as organic solvents, specifically paraffin or isoparaffin. The viscosity and the refractive index of the insulating liquid 31 are preferably as low as possible. This is because such low viscosity or refractive index improves mobility (response speed) of the migrating particles 32, and accordingly reduces energy (power consumption) for moving the migrating particles 32. In addition, a difference in the refractive index between the insulating liquid 31 and the porous layer 33 increases, resulting in an increase in light reflectance of the porous layer 33.

The insulating liquid 31 may contain various materials as necessary. The materials include, for example, a coloring agent, a charge controlling agent, a dispersion stabilizer, a viscosity modifier, a surfactant, and a resin.

[Migrating Particles]

The migrating particles 32, which is one or more electrically migrating, charged particles (electrophoretic particles), is allowed to move toward the pixel electrode 15 or the counter electrode 22 through the insulating liquid 31 depending on an electric field. The migrating particles 32 include, for example, particles (powders) of one or more of organic pigments, inorganic pigments, dyes, carbon materials, metal materials, metal oxides, glass materials, and polymer materials (resin). Alternatively, the migrating particles 32 may include crushed particles or capsuled particles of resin solid containing particles of one of the above materials. It is noted that materials corresponding to the carbon materials, the metal materials, the metal oxides, the glass materials, and the polymer materials are excluded from the materials corresponding to the organic pigments, the inorganic pigments, and the dyes.

The organic pigments include, for example, azo pigments, metal-complex azo pigments, polycondensation azo pigments, flavanthrone pigments, benzimidazolone pigments, phthalocyanine pigments, quinacridone pigments, anthraquinone pigments, perylene pigments, perinone pigments, anthrapyridine pigments, pyranthrone pigments, dioxazine pigments, thioindigo pigments, isoindolinone pigments, quinophthalone pigments, and indanthrene pigments. The inorganic pigments include, for example, zinc white, antimony white, carbon black, iron black, titanium boride, iron oxide red, Mapico Yellow, minium, cadmium yellow, zinc sulfide, lithopone, barium sulfide, cadmium selenide, calcium carbonate, barium sulfate, lead chromate, lead sulfate, barium carbonate, white lead, and alumina white. The dyes include, for example, nigrosine dyes, azo dyes, phthalocyanine dyes, quinophthalone dyes, anthraquinone dyes, and methine dyes. The carbon materials include, for example, carbon black. The metal materials include, for example, gold, silver, and copper. The metal oxides include, for example, titanium oxide, zinc oxide, zirconium oxide, barium titanate, potassium titanate, copper-chromium oxide, copper-manganese oxide, copper-iron-manganese oxide, copper-chromium-manganese oxide, and copper-iron-chromium oxide. The polymer materials include, for example, polymer compounds having a functional group of which the photo-absorption band lies in a visible region. Any type of the polymer materials may be used without particular limitation as long as the material has the photo-absorption band in the visible region.

While the content (concentration) of the migrating particles 32 in the insulating liquid 31 is not particularly limited, the content is, for example, 0.1 wt % to 10 wt % both inclusive. This is because the migrating particles 32 may have certain shielding (masking) property and mobility in such a content range. Here, if the content is less than 0.1 wt %, the migrating particles 32 may hardly shield the porous layer 33. If the content is more than 10 wt %, dispersibility of the migrating particles 32 is reduced, and thus the particles 32 hardly migrate and may agglomerate.

The migrating particles 32 have optional optical reflective characteristics (light reflectance). The light reflectance of the migrating particles 32, which is not particularly limited, is preferably set such that the migrating particles 32 is allowed to shield the porous layer 33. This is because a contrast is created due to a difference in the light reflectance between the migrating particles 32 and the porous layer 33.

A formation material of the migrating particles 32 is specifically selected depending on a function of the migrating particles 32 for creating the contrast, for example. Specifically, a material for light display by the migrating particles 32 includes, for example, metal oxide such as titanium oxide, zinc oxide, zirconium oxide, a barium titanate, and potassium titanate. A material for dark display by the migrating particles 32 includes, for example, a carbon material and metal oxide. The carbon material includes, for example, carbon black. The metal oxide includes, for example, copper-chromium oxide, copper-manganese oxide, copper-iron-manganese oxide, copper-chromium-manganese oxide, and copper-iron-chromium oxide. In particular, the carbon material is preferable. This is because the carbon material provides high chemical stability, high mobility, and high light absorption.

For light display by the migrating particles 32, while a color of the migrating particles 32 as viewed from the outside is not particularly limited as long as a contrast may be created, the color is particularly preferably whitish, and more preferably white. For dark display by the migrating particles 32, while a color of the migrating particles 32 as viewed from the outside is not particularly limited as long as a contrast may be created, the color is particularly preferably blackish, and more preferably black. This is because the contrast is improved in each case.

It is noted that the migrating particles 32 are preferably easily dispersed and charged in the insulating liquid 31 for a long term, and preferably hardly adsorbed in the porous layer 33. It is therefore acceptable that a dispersant (or charge modifier) is used in order to disperse the migrating particles 32 by electrostatic repulsion, or the migrating particles 32 are subjected to surface treatment, or both are combined.

The dispersant includes, for example, Solsperse series manufactured by Lubrizol corp., BYK series or Anti-Terra series manufactured by BYK-Chemie, and Span series manufactured by ICI Americas Inc.

The surface treatment includes, for example, rosin treatment, surfactant treatment, pigment derivative treatment, coupling agent treatment, graft polymerization treatment, and microencapsulation treatment. In particular, the graft polymerization treatment, the microencapsulation treatment, or a combination thereof is preferable. This is because such treatment provides long-term dispersion stability.

A material for the surface treatment includes, for example, a material (an adsorbent material) having a functional group that is adsorbable on a surface of a migrating particle 32 and a polymerizable functional group. A type of the adsorbable functional group is determined depending on a formation material of the migrating particles 32. For example, the adsorbable functional group includes an aniline derivative such as 4-vinyl aniline for the carbon material such as carbon black, and an organosilane derivative such as methacrylate 3-(trimethoxy cyril) propyl for the metal oxide. The polymerizable functional group includes, for example, a vinyl group, an acrylic group, and a methacryl group.

Alternatively, the material for the surface treatment includes, for example, a material (graft material) that can be grafted to a surface of the migrating particle 32 having the polymerizable functional group. The graft material preferably has the polymerizable functional group and a dispersion functional group that is allowed to be dispersed in the insulating liquid 31 and may maintain certain dispersibility with steric hindrance. A type of the polymerizable functional group is determined in the same way as in the described adsorbent material. The dispersion functional group includes, for example, a branched alkyl group in the case where the insulating liquid 31 is paraffin. A polymerization initiator such as azobisisobutyronitrile (AIBN) may be used for polymerization and graft of the graft material.

For reference, the method of dispersing the migrating particles 32 in the insulating liquid 31 as described above is described in detail in a book: "Dispersion Technique of Ultrafine Particles and Evaluation Thereof-Surface Treatment/Fine Grinding, and Dispersion Stabilization in Air, Liquid, and Polymer (Science & Technology Co., Ltd.)"

[Porous Layer]

Figure 2:
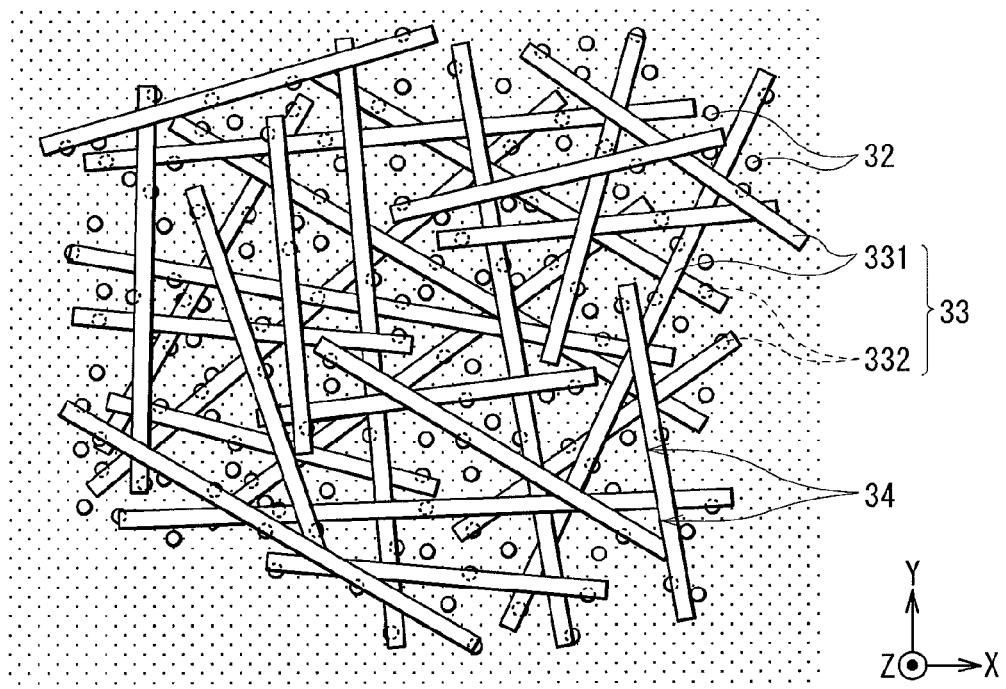
FIG. 2 is a plan view illustrating a configuration of a major part of the display device.

The porous layer 33 is a three-dimensional structure (an irregular network structure like a non-woven fabric) formed of a fibrous structure 331 as shown in FIG. 2, and, for example, supported by the spacer 40. The porous layer 33 has a plurality of gaps (pores 34) for movement of the migrating particles 32 in regions including no fibrous structure 331.

The fibrous structure 331 contains one or more non-migrating particles 332 and the one or more non-migrating particles 332 are held by the fibrous structure 331. In the porous layer 33 including the three-dimensional structure, a single fibrous structure 331 may be randomly tangled, or a plurality of fibrous structures 331 may be congregated and randomly overlapped with one another. In the case of the plurality of fibrous structures 331, each fibrous structure 331 preferably holds one or more non-migrating particles 332. FIG. 2 illustrates a case where the porous layer 33 is formed of a plurality of fibrous structures 331.

The porous layer 33 includes the three-dimensional structure formed of the fibrous structures 331. This is because outside light tends to be irregularly reflected (multiply scattered) due to the irregular three-dimensional structure, which increases light reflectance of the porous layer 33. In addition, a thickness of the porous layer 33 may be reduced for achieving such a high light reflectance. As a result, the contrast increases, and energy for the movement of the migrating particles 32 decreases. Furthermore, an average diameter of the pores 34 and the number thereof increase, and thus the migrating particles 32 easily move through the pores 34. Consequently, time and energy for the movement of the migrating particles 32 decrease.

The fibrous structures 331 contain the non-migrating particles 332, which enhances irregular reflection of the outside light, leading to further increase in the light reflectance of the porous layer 33. Consequently, the contrast further increases.

The fibrous structure 331 includes a fibrous material of which the fiber length is extremely larger than the fiber diameter. The fibrous structure 331 includes, for example, one or more of polymer materials or inorganic materials, but may include other materials. The polymer materials include, for example, nylon, polylactic acid, polyamide, polyimide, polyethylene terephthalate, polyacrylonitrile, polyethylene oxide, polyvinyl carbazole, polyvinyl chloride, polyurethane, polystyrene, polyvinyl alcohol, polysulfone, polyvinylpyrrolidone, polyvinylidene fluoride, polyhexafluoropropylene, cellulose acetate, collagen, gelatin, chitosan, and copolymers thereof. The inorganic materials include, for example, titanium oxide. In particular, the polymer materials are preferable for forming the fibrous structure 331. This is because the polymer materials are less reactive (less photoreactive, for example), or chemically stable, which suppresses an unintentional decomposition reaction of the fibrous structure 331. It is noted that if the fibrous structure 331 is formed of a highly reactive material, a surface of the fibrous structure 331 is preferably covered with an optional protective layer.

A shape (appearance) of the fibrous structure 331 is not particularly limited as long as the fibrous structure includes a fiber of which the length is extremely larger than the diameter as described above. Specifically, the fibrous structure may be linear, curled, or bent at some point. In addition, the fibrous structure 331 may not limitedly extend in one direction, and may be branched in two or more directions on the way. A method of forming the fibrous structure 331, which is not particularly limited, is preferably a phase separation process, a phase inversion process, an electrostatic (electric field) spinning process, a melt spinning process, a wet spinning process, a dry spinning process, a gel spinning process, a sol gel process, or a spray coating process, for example. This is because such a process facilitates formation of a stable fibrous material of which the fiber length is extremely larger than the fiber diameter.

The average fiber diameter of the fibrous structure 331, which is not particularly limited, is preferably as small as possible. This is because such an average fiber diameter enhances irregular reflection of light, and increases the diameter of the pore 34. However, the average fiber diameter preferably be determined such that the fibrous structure 331 may hold the non-migrating particles 332. Thus, the average fiber diameter of the fibrous structure 331 is preferably 10 μm or less. While the lower limit of the average fiber diameter is not particularly limited, the lower limit is, for example, 0.1

μm, but it may be 0.1 μm or less. The average fiber diameter is measured through microscope observation using a scanning electron microscope (SEM), for example. The average length of the fibrous structure 331 may be optionally set.

The average diameter of the pores 34, which is not particularly limited, is preferably as large as possible. This is because such average diameter facilitates the movement of the migrating particles 32 through the pores 34. Thus, the average diameter of the pores 34 is preferably 0.1 μm to 10 μm both inclusive.

The thickness of the porous layer 33, which is not particularly limited, is 5 μm to 100 μm both inclusive, for example. This is because such thickness improves shielding performance of the porous layer 33, and facilitates the movement of the migrating particles 32 through the pores 34. It is noted that the thickness of the porous layer 33 specified herein refers to a thickness of the porous layer 33 in a non-adjacent region R2 described below.

In particular, the fibrous structure 331 preferably includes nanofiber. This is because the nanofiber makes the three-dimensional structure to be complicated, which enhances irregular reflection of outside light, leading to further increase in the light reflectance of the porous layer 33, and increases an area rate of the pores 34 per unit area of the porous layer 33, which facilitates movement of the migrating particles 32 through the pores 34. Consequently, the contrast further increases, and energy for movement of the migrating particles 32 further decreases. The nanofiber refers to a fibrous material, of which the fiber diameter is 0.001 μm to 0.1 μm both inclusive and the fiber length is 100 times or more as large as the fiber diameter. The fibrous structure 331 including the nanofiber is preferably formed by the electrostatic spinning process. This is because the process facilitates formation of a stable fibrous structure 331 having such a small fiber diameter.

The fibrous structure 331 preferably has an optical reflective characteristics different from those of the migrating particles 32. Specifically, the light reflectance of the fibrous structure 331, which is not particularly limited, is preferably set such that the porous layer 33 as a whole is allowed to shield the migrating particles 32. This is because a contrast is created due to a difference in the light reflectance between the migrating particles 32 and the porous layer 33 as described before. Accordingly, a fibrous structure 331 that is optically transparent (transparent and colorless) in the insulating liquid 31 is not preferable. However, the fibrous structure 331 may have an optional light reflectance in the case where the light reflectance of the fibrous structure 331 hardly affects light reflectance of the porous layer 33 as a whole, and the light reflectance of the porous layer 33 as a whole is substantially determined by light reflectance of the non-migrating particles 332.

The non-migrating particles 332 are held (fixed) by the fibrous structures 331 so that the particles 332 do not electrically migrate. A formation material of the non-migrating particles 332 is, for example, similar to that of the migrating particles 32, and selected depending on a function of the non-migrating particles 332 as described below.

The non-migrating particles 332 may be partially exposed from the fibrous structures 331 or buried within the structures 331 as long as they are held by the fibrous structures 331.

The non-migrating particles 332 have optical reflective characteristics different from those of the migrating particles 32. The light reflectance of the non-migrating particles 332, which is not particularly limited, is preferably set such that the porous layer 33 as a whole may shield the migrating particles 32. This is because a contrast is created due to the difference in the light reflectance between the migrating particles 32 and the porous layer 33 as described before.

A formation material of the non-migrating particles 332 is, for example, selected depending on a function of the non-migrating particles 332 for creating the contrast, for example. Specifically, a material for light display by the non-migrating particles 332 is similar to a material selected for light display by the migrating particles 32. On the other hand, a material for dark display by the non-migrating particles 332 is similar to a material selected for dark display by the migrating particles 32. In particular, the material selected for light display by the non-migrating particles 332 is preferably metal oxide. This is because the metal oxide provides high chemical stability, high fixity, and high optical reflectivity. The formation material of the non-migrating particles 332 may be the same as or different from that of the migrating particles 32 as long as the contrast may be created.

A viewed color in light display or dark display by the non-migrating particles 332 is similar to the described viewed color of the migrating particles 32.

In particular, the partitions 35 are partially adjacent to the porous layer 33 on a side opposite to the display surface. The partitions 35 define spaces (cells 36 described below) for accommodating the migrating particles 32. Thus, an existence area of the porous layer 33 is divided into regions (adjacent regions R1) where the partitions 35 are adjacent to the porous layer 33 and regions (non-adjacent regions R2) where the partitions 35 are not adjacent to the porous layer 33.

The area rate of the pores 34 per unit area of the porous layer 33 (hereinafter, referred to as area occupancy of the pores 34) is small in the adjacent regions R1 compared with in the non-adjacent regions R2. This is because the porous layer 33 is formed such that the area occupancy of the pores 34 is substantially uniform and then partially pressed, for example. A thickness T of the porous layer 33 is small in the adjacent regions R1 compared with in the non-adjacent regions R2.

The area occupancy of the pores 34 is represented as follows on the basis of the area of the porous layer 33 and the area of the pores 34 that exist in the porous layer 33: area occupancy (%)=(area of the pores 34/area of the porous layer 33)*100. The area occupancy is allowed to be checked, for example, by machining the porous layer 33 into a section with a cryotome, and then observing a cross section of the porous layer 33 with a metallographic microscope, a confocal microscope, or a scanning electron microscope. While visual check may be made to distinguish the fibrous structure 331 (including the non-migrating particles 332) from the pores 34 (to specify boundaries between the fibrous structure 331 and the pores 34), image processing software may be used to identify an image on the basis of a difference in a contrast. The software may be similarly used for calculating area.

While the area occupancy is used herein to specify a difference in occupancy of the pores 34 between the adjacent regions R1 and the non-adjacent regions R2, volume occupancy may be used instead. This is because the difference in occupancy of the pores 34 may be also specified using the volume occupancy, as in the case of the area occupancy.

The partitions 35 are adjacent to the porous layer 33 on the side opposite to the display surface. This is because such a configuration suppresses a reduction in the contrast due to an existence of the partitions 35. In detail, in the case where the partitions 35 are formed of an optically transparent material such as a resin as described below, the contrast tends to be reduced in each cell 36 due to light (visible light) leaked from an adjacent cell 36 through a partition 35. In this regard, the porous layer 33 that hardly transmits light (has a small area occupancy of the pores 34) exists on a front side of the partitions 35 as viewed from a display surface side, suppressing the reduction in the contrast due to the light leaked from an adjacent cell 36, or other light (for example, light generated from the drive substrate 10). This suppresses a reduction in the contrast due to the existence of the partitions 35.

The area occupancy of the pores 34 is small in the adjacent regions R1 compared with in the non-adjacent regions R2. This is because the partitions 35 are greatly shielded by the porous layer 33 in such a case compared with a case where the area occupancy of the pores 34 is larger in the adjacent regions R1. In addition, since size of each pore 34 and the number of the pores 34 decrease with a decrease in the area occupancy of the pores 34, the migrating particles 32 hardly move to an adjacent cell 36 through the pores 34 in the adjacent region R1.

The thickness T of the porous layer 33 is small in the adjacent regions R1 compared with in the non-adjacent regions R2. This is because the porous layer 33 is pressed in the adjacent regions R1 such that the partitions 35 are sufficiently shielded by the porous layer 33, and the migrating particles 32 hardly move unintentionally, as described before. In addition, a thickness of the electrophoretic element 30 as a whole is reduced compared with a case where the thickness T of the porous layer 33 is not small in the adjacent regions R1 compared with in the non-adjacent regions R2, namely, the porous layer 33 is not pressed in the adjacent regions R1, leading to a reduction in thickness of the electrophoretic element 30.

An exemplary formation procedure of the porous layer 33 is as follows. First, a formation material (for example, a polymer material) of the fibrous structures 331 is dispersed or dissolved in an organic solvent to prepare a spinning solution. Then, the non-migrating particles 332 are added to the spinning solution and mixed well by stirring, so that the non-migrating particles 332 are dispersed. Then, the spinning solution is spun into fibers by the electrostatic spinning process. Consequently, the non-migrating particles 332 are held by the fibrous structures 331, resulting in formation of the porous layer 33 having a substantially uniform area occupancy of the pores 34. Finally, part of the porous layer 33 is pressed so that area occupancy of the pores 34 in such pressed portions is decreased. As a member for pressing the porous layer 33, the partitions 35, which are eventually adjacent to the porous layer 33, may be used, or other member may be used. Any member, which may press the porous layer 33, may be used. Consequently, the porous layer 33 has regions with decreased area occupancy of the pores 34 and regions with the area occupancy of the pores 34 being not decreased. The partitions 35 are eventually adjacent to the porous layer 33, and consequently the former regions become the adjacent regions R1, and the latter regions become the non-adjacent regions R2.

[Preferable Method of Displaying Electrophoretic Element]

In the electrophoretic element 30, the contrast is created due to the difference in the light reflectance between the migrating particles 32 and the porous layer 33 (including the fibrous structure 331 containing the non-migrating particles 332). Here, light display may be provided by the migrating particles 32 with dark display by the porous layer 33, and vice versa. Such a difference in functions is determined depending on a magnitude relationship between the light reflectance of the migrating particles 32 and the light reflectance of the porous layer 33. Specifically, light reflectance of one component for light display is set higher than light reflectance of the other component for dark display.

In particular, dark display is preferably provided by the migrating particles 32 with light display by the porous layer 33. Accordingly, in the case where the light reflectance of the porous layer 33 is substantially determined by the light reflectance of the non-migrating particles 332, the light reflectance of the non-migrating particles 332 is preferably higher than the light reflectance of the migrating particles 32. This is because light reflectance for light display extremely increases due to irregular reflection of the outside light caused by the porous layer 33 in such a case, and accordingly the contrast extremely increases.

[Partitions]

The partitions 35 are a member for defining areas in which the migrating particles 32 is allowed to exist. The partitions 35 extend toward the porous layer 33, and are partially adjacent to the porous layer 33 on a side opposite to the display surface in the adjacent regions R1.

Figure 3:
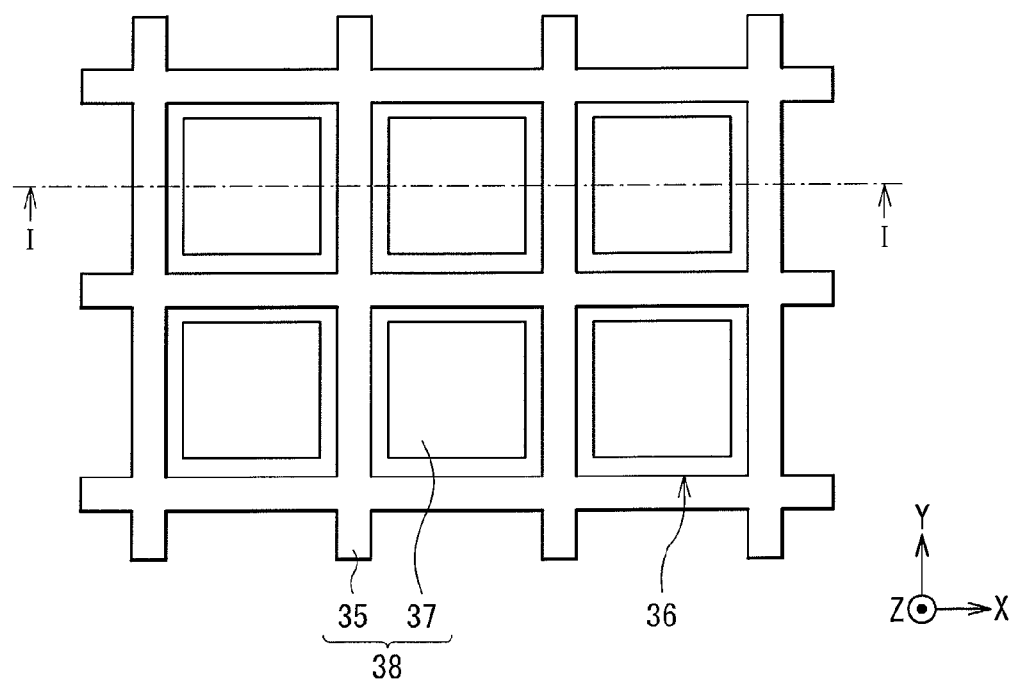
FIG. 3 is a plan view illustrating a configuration of another major part of the display device.

The partitions 35 define one or more spaces (cells 36) for accommodating the migrating particles 32 as shown in FIGS. 1 and 3. While the number and an arrangement pattern of the cells 36 are not particularly limited, the arrangement pattern is preferably a matrix pattern (arrangement including a plurality of rows and columns), for example, to form a plurality of cells 36. While a profile (opening profile) of each cell 36 is not particularly limited, the profile may be, for example, a rectangular shape as shown in FIG. 3, or may be another shape, for example, a hexagon.

The partitions 35 may be provided, for example, on one surface of a support plate 37 and supported by the support plate 37. In such a case, the partitions 35 and the support plate 37 may be provided in one unit (a partition unit 38). However, the partitions 35 and the support plate 37 may be unified or separated. Here, the partition unit 38 is provided covering the pixel electrodes 15 and the planarization insulating layer 14 around the respective pixel electrodes 15, for example.

A formation material of the partitions 35, which is not particularly limited as long as it does not affect the operation performance of the electrophoretic element 30, is preferably a resin having a good moldability. This is because such a resin facilitates formation of the partitions 35 having desired size and shape. The resin includes, for example, a thermoplastic resin or a photo-curing resin (including a photolithographic resist), or may include other resin. A formation material of the support plate 37 is selected in a similar way.

In the case of using the resin as the formation material of the partitions 35, the partitions 35 are formed by a thermal imprint process using the thermoplastic resin or a photo-imprint process using the photo-curing resin, for example. Specifically, in the thermal imprint process, a mold is pressed to a resin (polymer material) heated to the glass transition temperature or more, and then the resin is cooled and the mold is released from the resin, for example. As a result, a surface structure of the mold is transferred to a surface of the resin, resulting in formation of the partition unit 38 having a desired surface structure. The mold may be, for example, a photoresist film formed by a photolithography process, or a metal plate formed by bite machining or the like.

A width W of the partition 35 may be uniform or non-uniform in its extending direction. In particular, the width W is preferably gradually reduced toward the porous layer 33. This is because the opening area of the cell 36 is widened on the display surface side, and an unmovable area (the adjacent region R1) of the migrating particles 32 is accordingly narrowed, which expands an image display area. While an inclination angle (so-called taper angle) of a side face of the partition 35 is not particularly limited, the angle is, for example, 60° to 90° both inclusive, and preferably 75° to 85° both inclusive.

A pitch or height of the partitions 35 may be optionally set without being particularly limited. For example, the pitch of the partitions 35 is 30 μm to 300 μm both inclusive, and preferably 10 μm to 100 μm both inclusive. The height of each partition 35 is 60 μm to 150 μm both inclusive, and preferably 30 μm to 50 μm both inclusive.

In particular, the height of the partitions 35 and the thickness T of the porous layer 33 in the adjacent regions R1 are preferably substantially uniform. This is because such uniform height and thickness make the distances (so-called gaps) between the pixel electrodes 15 and the counter electrode 22 to be even, leading to uniform electric-field strength. This reduces unevenness in response speed.

[Spacer]

The spacer 40 is formed of, for example, an insulating material such as a polymer material. However, a configuration of the spacer 40 is not particularly limited, and the spacer may be configured of a sealing member containing fine particles mixed therein.

In particular, the spacer 40 preferably has a pattern, such as a lattice pattern, such that movement of the migrating particles 32 is not prevented, and the migrating particles 32 are uniformly distributed, though the pattern is not particularly limited. In particular, the spacer 40 preferably has a small thickness to the utmost, for example, 10 μm to 100 μm both inclusive, in order to reduce power consumption, though the thickness is not particularly limited.

[Operation of Display Device]

Figure 4:
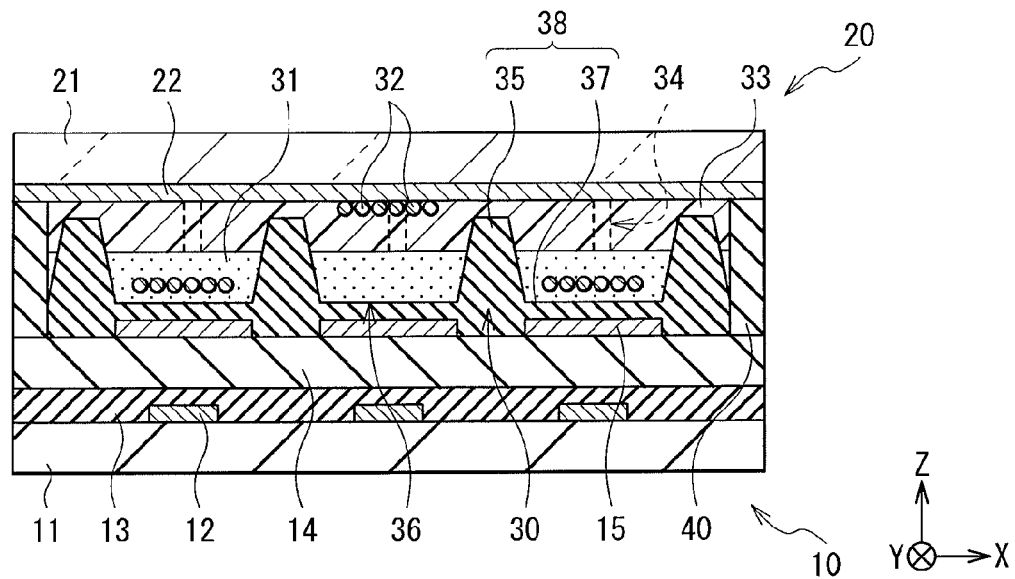
FIG. 4 is a sectional view for explaining operation of the display device.

The display device operates as follows. FIG. 4 is a diagram for explaining operation of the display device, showing a sectional configuration corresponding to FIG. 1.

Here, the light reflectance of the migrating particles 32 is lower than the light reflectance of the porous layer 33 (including the fibrous structure 331 and the non-migrating particles 332), for example. Thus, description is made on a case where dark display is provided by the migrating particles 32 with light display by the porous layer 33.

In the initial state, the migrating particles 32 in all cells 36 are located near the pixel electrodes 15 in the insulating liquid 31, as shown in FIG. 1. In this state, when the display device is viewed from a display surface side, the migrating particles 32 are shielded by the porous layer 33 in all pixels (light display), so that no contrast is created (no image display).

When pixels are selected by the TFTs 12 and thus an electric field is applied between pixel electrodes 15 and the counter electrode 22, the migrating particles 32 move to the counter electrode 22 through the pores 34 in the porous layer 33 in the cells 36 to which the electric field is applied, as shown in FIG. 4. In this state, when the display device is viewed from the display surface side, pixels in which the migrating particles 32 are shielded by the porous layer 33 (light display), and pixels in which the migrating particles 32 are not shielded by the porous layer 33 (dark display), coexist, so that a contrast is created due to such a difference in display colors. In this way, the display color (light display or dark display) is switched for each of the cells 36, leading to image display due to a contrast across all pixels.

[Method of Manufacturing Display Device]

Figure 5:
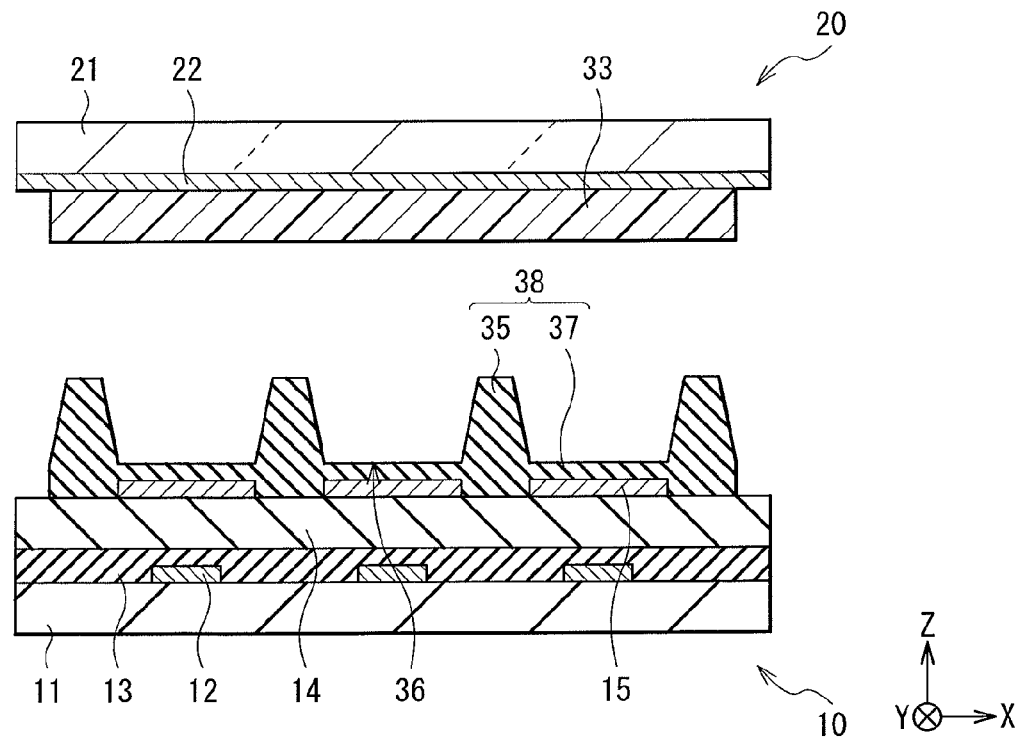
FIG. 5 is a sectional view for explaining a method of manufacturing the display device.
Figure 6:
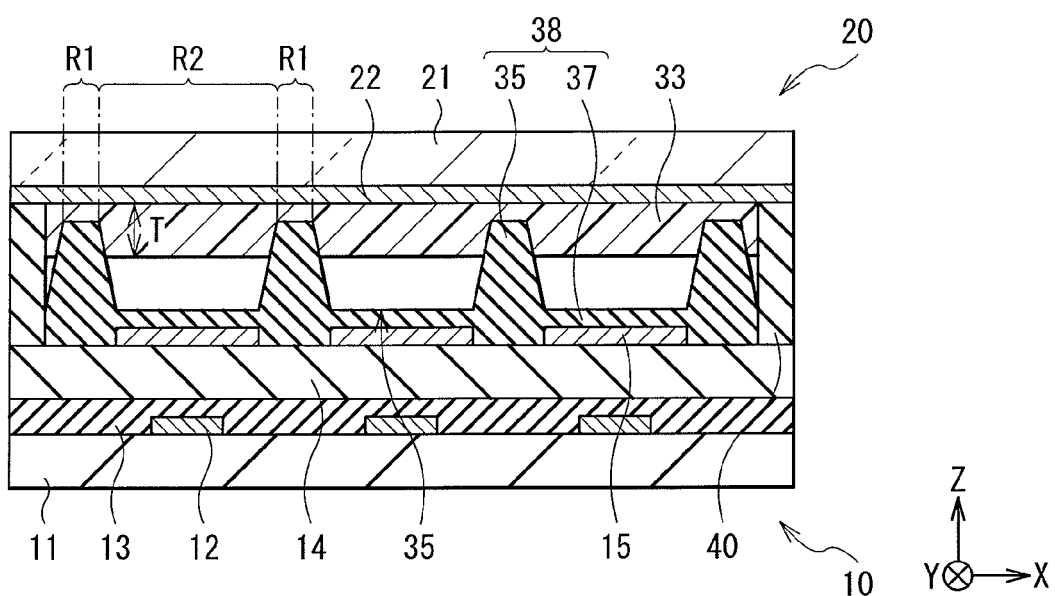
FIG. 6 is a sectional view for explaining steps following the steps shown in FIG. 5.

Next, a method of manufacturing the display device is described. FIGS. 5 and 6 are diagrams for explaining the method of manufacturing the display device, each diagram showing a sectional configuration corresponding to FIG. 1.

First, as shown in FIG. 5, the TFTs 12, the protective layer 13, the planarization insulating layer 14, and the pixel electrodes 15 are formed in this order on one surface of the support base 11 to produce the drive substrate 10, and the counter electrode 22 is formed on one surface of the support base 21 to produce the counter substrate 20. As a method of forming each component, for example, existing formation method may be selected and used as needed.

Then, the partition unit 38 is formed over the pixel electrodes 15 and the planarization insulating layer 14 around the respective pixel electrodes 15 of the drive substrate 10. For forming the partition unit 38, for example, a resin is molded with the thermal imprint process to integrally form the partitions 35 and the support plate 37. It is noted that a protective layer may be provided between the planarization insulating layer 14 and the pixel electrodes 15, and the partition unit 38.

The porous layer 33 is formed over the counter electrode 22 of the counter substrate 20. For forming the porous layer 33, for example, a formation material of the fibrous structure 331 is dispersed in an organic solvent to prepare a spinning solution, and the non-migrating particles 332 are dispersed in the spinning solution for subsequent spinning by the electrostatic spinning process. Consequently, the non-migrating particles 332 are held by the fibrous structure 331, resulting in formation of the porous layer 33. In the resultant porous layer 33, the area occupancy of the pores 34 is substantially uniform across the entire layer 33.

Then, as shown in FIG. 6, the drive substrate 10 and the counter substrate 20 are oppositely disposed with the spacer 40 in between so as to define a space between the drive substrate 10 and the counter substrate 20 to be filled with the insulating liquid 31 (see FIG. 1). Here, the porous layer 33 is partially pressed by ends of the partitions 35 so that the area occupancy of the pores 34 is decreased in such pressed portions (the adjacent regions R1) compared with in other portions (the non-adjacent regions R2). Consequently, the thickness T of the porous layer 33 is reduced in the adjacent regions R1 compared with in the non-adjacent regions R2.

Finally, the space enclosed by the drive substrate 10, the counter substrate 20, and the spacer 40 is filled with the insulating liquid 31 having the migrating particles 32 dispersed therein. Here, the migrating particles 32 are disposed in each of the cells 36 defined by the partitions 35. Consequently, the display device is completed.

While a case where the porous layer 33 is pressed using the partitions 35 has been described with reference to FIG. 6, a member other than the partition 35 may be used to partially press the porous layer 33 so that the partitions 35 are then disposed adjacently to such pressed portions of the porous layer 33. In such a case, the area occupancy of the pores 34 in the porous layer 33 is also locally decreased in the adjacent regions R1. However, the partitions 35 are preferably used to press the porous layer 33 in order to ensure certain adhesion of the partitions 35 to the porous layer 33 and to simplify a manufacturing process of the electrophoretic element 30.

[Operation and Effects of Display Device]

According to the display device, the porous layer 33 is formed of the fibrous structure 331 that contains the non-migrating particles 332 having the optical reflective characteristics different from those of the migrating particles 32.

In such a case, while the porous layer 33 has the pores 34 having enough size and number to allow the movement of the migrating particles 32, the outside light is greatly irregularly reflected even on the porous layer 33 having a small thickness. In particular, the outside light is also greatly irregularly reflected not only by the fibrous structure 331 but also by the non-migrating particles 332. This improves the light reflectance of the porous layer 33, leading to an increase in the contrast. In addition, this facilitates the movement of the migrating particles 32 through the pores 34, reducing time and energy for the movement.

In addition, in the display device, the partitions 35 are partially adjacent to the porous layer 33 on the side opposite to the display surface, and the area occupancy of the pores 34 in the porous layer 33 is small in the adjacent regions R1 compared with in the non-adjacent regions R2.

In such a case, the partitions 35 define areas in which the migrating particles 32 are allowed to exist, and thus the migrating particles 32 hardly move through the porous layer 33 in the adjacent regions R1, leading to suppression of diffusion, convection, and agglomeration of the migrating particles 32. This suppresses a reduction in image quality, such as unevenness in display, leading to stable image display. Moreover, the partitions 35 are shielded by the porous layer 33 as viewed from a display surface side, which suppresses a reduction in the contrast due to existence of the partitions 35, leading to an improvement in the contrast.

Consequently, a high contrast and fast response are achieved with low power consumption, and thus high-grade images may be displayed with low power consumption.

In particular, if the thickness T of the porous layer 33 is small in the adjacent regions R1 compared with in the non-adjacent regions R2, the total thickness of the electrophoretic element 30 is reduced, leading to a reduction in thickness of the display device even if the partitions 35 are provided.

Moreover, if the width W of each partition 35 is gradually reduced toward the porous layer 33, the opening area of the cell 36 is widened, expanding a display area of images.

In addition, if the fibrous structure 331 is formed by the electrostatic spinning process or includes the nanofiber, the three-dimensional structure, which enhances irregular reflection of the outside light, is easily formed by the fibrous structure 331, and size of each pore 34 and the number of the pores 34 also increase, leading to a higher effect. In addition, if the light reflectance of the non-migrating particles 332 is higher than the light reflectance of the migrating particles 32 so that dark display is provided by the migrating particles 32 with light display by the porous layer 33, the light reflectance of the porous layer 33 significantly increases due to the irregular reflection of the outside light, leading to a higher effect.

In addition, the partitions 35 are used as a member for partially pressing the porous layer 33 in order to locally decrease the area occupancy of the pores 34 during the manufacturing process of the display device, making it possible to ensure certain adhesion of the partitions 35 to the porous layer 33, and to simplify the manufacturing process of the electrophoretic element 30.

Example

Next, an Example according to the embodiment of the technology is described in detail.
[Experiment]
A display device was produced according to the following procedure using migrating particles for dark display and a porous layer for light display.
[Preparation of Migrating Particles]
Ten grams of Carbon black (#40 manufactured by Mitsubishi Chemical Corporation) was added to 1 dm³ (1) of water, and such a mixture was electromagnetically stirred, and then 1 cm³ (ml) of hydrochloric acid (37 wt % solution) and 0.2 g of 4-vinyl aniline were added to the mixture to prepare a solution A. Then, 0.3 g of sodium nitrite was dissolved in 10 cm³ of water, and then the solution was heated to 40° C. to prepare a solution B. Then, the solution B was slowly added to the solution A, and then the mixed solutions were stirred for 10 hours. Then, a product obtained through a reaction of the solutions was centrifuged to produce a solid. Then, the solids was rinsed with water, and then rinsed with acetone while being centrifuged, and then dried in a vacuum dryer (at a temperature of 50° C.) overnight.

Then, 5 g of the solid, 100 cm³ of toluene, 15 cm³ of methacrylate 2-ethyl hexyl, and 0.2 g of AIBN were put into a reaction flask, to which a nitrogen purging device, an electromagnetic stirring stick, and a reflux column were attached, for mixing. Then, the reaction flask was purged for 30 minutes with nitrogen while the above mixture was stirred. Then, the reaction flask was put into an oil bath, and gradually heated to 80° C. while the mixture was continuously stirred, and then maintained at the temperature for 10 hours. Then, a solid was obtained by centrifugation, and tetrahydrofuran (THF) and ethyl acetate were added to the solid, and such a mixture was centrifuged three times. The resultant was rinsed every three centrifugations. Then the solids were extracted and dried in a vacuum dryer (at a temperature of 50° C.) overnight. Consequently, 4.7 g of polymer-covered carbon black as black migrating particles were produced.

Then, 0.5% in total of an Isopar G (manufactured by Exxon Mobil Corp.) solution containing N,N-dimethyl propane-1, 3-diamine, 12-hydroxy octadecanoic acid, and methoxysulfonyloxymethane (Solsperse 17000 manufactured by Lubrizol corp.), and 1.5% of sorbitan trioleate (Span85) was prepared as an insulating liquid, and then 0.1 g of the migrating particles were added to 9.9 g of the insulating liquid, and such a mixture was stirred for 5 minutes in a bead mill. Then, the mixture was centrifuged for 5 minutes in a centrifuge (at a rotational speed of 2000 rpm), and then the beads were removed.
[Preparation of Porous Layer]
Twelve grams of polyacrylonitrile (a product manufactured by Aldrich corporation: molecular weight of 150000), which was a formation material of a fibrous structure, was dissolved in 88 g of N,N'-dimethylformamide to prepare a solution C. Then, 30 g of titanium oxide (TITONE R-45M manufactured by Sakai Chemical Industry Co., Ltd.) as non-migrating particles was added to 70 g of the solution C, and then such materials were mixed in a bead mill to prepare a spinning solution. Then, the spinning solution was poured into a syringe, and spinning was reciprocally performed eight times with an electrospinning machine (NANON manufactured by MECC Co., Ltd.) on a glass substrate having pixel electrodes (ITO) in a predetermined pattern thereon. The spinning condition was as follows: electric field strength of 28 kV, discharge speed of 0.5 cm³/m, spinning distance of 15 cm, and scan rate of 20 mm/sec. Then, the glass substrate was dried for 12 hours in a vacuum oven (at a temperature of 75° C.) to form the fibrous structure containing the non-migrating particles.
[Preparation of Partition Unit]
Silane coupling treatment was performed to a surface of the pixel electrodes and the like as a base of a partition unit in order to ensure certain adhesion strength of an ultraviolet curing imprint resin (hereinafter, referred to as UV imprint resin), which was a formation material of the partition unit, to the base. Here, a silane coupling agent (KBM-503 manufactured by Shin-Etsu Chemical Co., Ltd.) and ethyl acetate were mixed in a weight ratio of 2 to 8, and then such a mixed solution was applied on a surface of the base and left for 5 minutes. Then, the mixed solution was removed from the surface of the base, and then the base was heated for 15 minutes at 120° C. Then, the surface of the base was slightly cooled, and washed by alcohol, and then washed by pure water. Then, the surface of the base was dried to complete the silane coupling treatment.

Then, 0.1 cm³ (ml) of a solution of UV imprint resin (PAK-01-CL manufactured by Toyo Gosei Co., Ltd) was dropped by 0.1 cm³ (ml) on the surface of the base subjected to the silane coupling treatment. Then, the base, on which the solution of the UV imprint resin had been dropped, was irradiated with ultraviolet rays to cure the UV imprint resin while a mold was pressed to the base, and then the mold was removed. Consequently, a surface structure of the mold was transferred to the cured UV nanoimprint resin. As a result, the partition unit having the configuration as shown in FIGS. 1 and 3, in which the partitions were integrated with the support plate, was formed. Dimensions of each partition were as follows: minimum width of 8 μm, maximum width of 25 μm, height of 50 μm, and a taper angle of 80°.

[Assembling of Display Device]

An unnecessary portion of the porous layer, which was adhered to a region of a glass substrate having no pixel electrode, was removed from the glass substrate having the pixel electrodes (ITO) thereon. Then, a PET film (thickness of 50 μm) was placed as a spacer on a glass substrate having a counter electrode (ITO) on the entire surface thereof, and then the glass substrate having the pixel electrodes and the porous layer was stacked thereon. Finally, the insulating liquid, in which the migrating particles were dispersed, was injected into a gap between the two glass substrates.

Comparative Example

A display device was produced according to a similar procedure to in the Example except that the partition unit was not included.

Luminosity (L value) of a display surface was measured for each of the display devices according to the Example and the comparative example with a spectrum densimeter (i1Basic manufactured by X-Rite, Incorporated). As a result, the luminosity was 68 in the Example and 70 in the comparative example. This result showed that the partitions did not substantially affect the light reflectance (light display) of the porous layer in the Example where partitions were included, so that substantially the same light-display performance (white reflectance) as that in the comparative example, in which the partitions were not included, was achieved in the Example. Such an experimental result confirmed that certain light reflectance of the porous layer was ensured according to the embodiment of the present technology even if the partitions were included, achieving a high contrast.

While the technology has been described with the embodiment hereinbefore, the technology was not limited to the aspects described in the embodiment, and various modifications or alterations may be made. For example, the electrophoretic element according to the embodiment of the technology may be not only applied to display devices, but also applied to other electronic devices.

The present disclosure contains subject matter related to that disclosed in Japanese Priority Patent Application JP 2011-031861 filed in the Japan Patent Office on Feb. 17, 2011, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An electrophoretic element comprising:
   an electrophoretic particle;
   a porous layer formed of a fibrous structure containing a non-migrating particle having optical reflective characteristics different from those of the electrophoretic particle and having a plurality of pores; and
   a partition that is partially adjacent to the porous layer and defines a space for accommodating the electrophoretic particle,
   wherein a thickness of the porous layer is small in the adjacent region compared with in the non-adjacent region.

2. The electrophoretic element according to claim 1, wherein a width of the partition is gradually reduced toward the porous layer.

3. The electrophoretic element according to claim 1, wherein the fibrous structure is formed of a polymer material or an inorganic material, and has an average fiber diameter of 10 μm or less.

4. The electrophoretic element according to claim 1, wherein the electrophoretic particle and the non-migrating particle are formed of an organic pigment, an inorganic pigment, a dye, a carbon material, a metal material, a metal oxide, glass, or a polymer material.

5. The electrophoretic element according to claim 1, wherein the non-migrating particle has higher light reflectance than the electrophoretic particles.

6. A display device comprising:
   an electrophoretic element between a pair of substrates, one or both of the substrates being optically transparent,
   wherein the electrophoretic element includes an electrophoretic particle,
   a porous layer formed of a fibrous structure containing a non-migrating particle having optical reflective characteristics different from those of the electrophoretic particle and having a plurality of pores, and a partition that is partially adjacent to the porous layer on a side opposite to a display surface and defines a space for accommodating the electrophoretic particle,
   wherein a thickness of the porous layer is small in the adjacent region compared with in the non-adjacent region.

7. An electrophoretic element comprising:
   an electrophoretic particle; a porous layer formed of a fibrous structure containing a non-migrating particle having optical reflective characteristics different from those of the electrophoretic particle and having a plurality of pores; and
   a partition defining a space for accommodating the electrophoretic particle,
   wherein a thickness of the porous layer is small in a first region where the partition exists compared with in a second region where the partition does not exist.

8. The electrophoretic element according to claim 7, wherein a width of the partition is gradually reduced toward the porous layer.

9. The electrophoretic element according to claim 7, wherein the fibrous structure is formed of a polymer material or an inorganic material, and has an average fiber diameter of 10 μm or less.

10. The electrophoretic element according to claim 7, wherein the electrophoretic particle and the non-migrating particle are formed of an organic pigment, an inorganic pigment, a dye, a carbon material, a metal material, a metal oxide, glass, or a polymer material.

11. The electrophoretic element according to claim 7, wherein the non-migrating particle has higher light reflectance than the electrophoretic particles.

12. A display device comprising:
an electrophoretic element between a pair of substrates, one or both of the substrates being optically transparent,
wherein the electrophoretic element includes an electrophoretic particle, a porous layer formed of a fibrous structure containing a non-migrating particle having optical reflective characteristics different from those of the electrophoretic particle and having a plurality of pores, and a partition defining a space for accommodating the electrophoretic particle,
wherein a thickness of the porous layer is small in a first region where the partition exists compared with in a second region where the partition does not exist.

* * * * *